(12) United States Patent
Hastad et al.

(10) Patent No.: US 11,866,985 B2
(45) Date of Patent: Jan. 9, 2024

(54) ASSEMBLY FOR COVERING AGRICULTURAL RECEIVING UNIT

(71) Applicant: Auxilium Ag LLC, Sherburn, MN (US)

(72) Inventors: Chad W. Hastad, Sherburn, MN (US); Anthony Von Ohlen, Sherburn, MN (US)

(73) Assignee: AUXILIUM AG LLC, Sherburn, MN (US)

( * ) Notice: Subject to any disclaimer, the term of this patent is extended or adjusted under 35 U.S.C. 154(b) by 0 days.

(21) Appl. No.: 17/650,647

(22) Filed: Feb. 10, 2022

(65) Prior Publication Data

US 2022/0251897 A1 Aug. 11, 2022

Related U.S. Application Data

(60) Provisional application No. 63/221,049, filed on Jul. 13, 2021, provisional application No. 63/148,497, filed on Feb. 11, 2021.

(51) Int. Cl.
*E05F 15/00* (2015.01)
*E05F 15/73* (2015.01)
*E05F 15/53* (2015.01)
*E05F 15/60* (2015.01)

(52) U.S. Cl.
CPC .............. *E05F 15/73* (2015.01); *E05F 15/53* (2015.01); *E05F 15/60* (2015.01); *E05Y 2201/434* (2013.01); *E05Y 2201/456* (2013.01); *E05Y 2400/40* (2013.01); *E05Y 2400/44* (2013.01); *E05Y 2900/604* (2013.01)

(58) Field of Classification Search
CPC ............................ E05F 15/53; E05Y 2400/40
See application file for complete search history.

(56) References Cited

U.S. PATENT DOCUMENTS

| | | | |
|---|---|---|---|
| 7,850,142 B2 * | 12/2010 | Sladojevic | B25B 11/002 249/219.1 |
| 10,525,803 B2 * | 1/2020 | Hutchens, III | B32B 15/10 |
| 2012/0048140 A1 * | 3/2012 | Dial | B65G 67/50 105/377.05 |

(Continued)

FOREIGN PATENT DOCUMENTS

| | | | | |
|---|---|---|---|---|
| ES | 2709677 | | 4/2019 | |
| ES | 2709677 A1 * | | 4/2019 | ............. A01F 25/02 |

(Continued)

OTHER PUBLICATIONS

International Search Report received for related PCT Application No. PCT/US2022/070620 dated May 24, 2022 (2 pages).

*Primary Examiner* — Daniel J Troy
*Assistant Examiner* — Daniel Alvarez
(74) *Attorney, Agent, or Firm* — The Small Patent Law Group LLC; Josef L. Hoffmann

(57) ABSTRACT

An assembly for covering an agricultural receiving unit is provided. The assembly may include a covering body configured to, in a first position, extend over an opening of the agricultural receiving unit to prevent access to the opening. The assembly may also include an actuation assembly configured to move the covering body from the first position to a second position. In the second position, the covering body is configured to permit access to the opening of the agricultural receiving unit.

18 Claims, 7 Drawing Sheets

(56) References Cited

U.S. PATENT DOCUMENTS

| | | | |
|---|---|---|---|
| 2012/0118195 A1* | 5/2012 | Creighton | B61D 39/001 |
| | | | 105/377.01 |
| 2013/0092509 A1* | 4/2013 | Hall | A01C 15/003 |
| | | | 198/581 |
| 2016/0360696 A1 | 12/2016 | Vandevelde et al. | |

FOREIGN PATENT DOCUMENTS

| | | |
|---|---|---|
| JP | H08312934 | 11/1996 |
| JP | H08326080 | 12/1996 |

* cited by examiner

ASSEMBLY FOR COVERING AGRICULTURAL RECEIVING UNIT

CROSS REFERENCE TO RELATED APPLICATIONS

This application claims priority to U.S. Provisional Patent Application No. 63/221,049, entitled ASSEMBLY FOR COVERING AGRICULTURAL RECEIVING UNIT, which was filed on 13 Jul. 2021, and U.S. Provisional Patent Application No. 63/148,497 entitled ASSEMBLY FOR COVERING AGRICULTURAL RECEIVING UNIT, which was filed on 11 Feb. 2021, the entire disclosures of which are incorporated herein by reference.

BACKGROUND

Embodiments herein generally relate to assemblies for covering an agricultural receiving unit.

Agricultural receiving units are utilized by farmers for receiving agricultural products such as grain, beans, corn, seeds, or the like from a vehicle. Specifically, when the agricultural product is harvested, the agricultural product is often placed in a truck or other vehicle. The vehicle then transports the agricultural product to a remote location for storage within an agricultural receiving unit.

The agricultural receiving unit is typically located underground to maximize space while also protecting the agricultural product from the environment. In order to receive the agricultural product, the agricultural receiving unit has an opening that is typically grated. In this manner, the vehicle hauling the agricultural product can back the vehicle into place over the grate, and open a door accessing the vehicle bed so that gravity causes the agricultural product to flow into the grated opening. In particular, the grate prevents a wheel of a vehicle from accidentally being displaced within the opening during unloading.

Because the agricultural receiving unit receives food items, regulations have been put into place to minimize contaminants from reaching the agricultural product within the agricultural receiving unit. Specifically, the grated opening, while a passageway for the agricultural product, is also a passageway for dirt, debris, dust, mud, or the like. As a result, the opening of the agricultural receiving unit is required to be covered when not in use. By covering the opening, the contaminants are prevented from entering the agricultural receiving unit.

Still, covering such agricultural receiving units is impractical. Coverings are large and difficult to manage for a single truck driver. In addition, no farm police exist, and consequently, enforcement of this regulation is exceptionally limited. Thus, often, such the opening is often not covered. When the opening is covered, regularly the covering is merely tossed to the side, not cleaned, and can be a source of contaminants themselves. As a result, the benefits of such coverings are minimized.

In addition, when the agricultural product is unloaded, often the vehicle can partially miss the opening, or overload the grate of the opening such that agricultural product spills around the perimeter of the opening. Such excess agricultural product either never makes it into the agricultural receiving unit, reducing yield, or is pushed in by a vehicle operator, worker, or farmer. Such pushing into the opening can include by use of a dirty broom, shovel, shoe, hands, etc. In this manner, the overloading causes additional undesired contaminants to be received within the agricultural receiving unit.

SUMMARY

In accordance with embodiments herein, an assembly for covering an agricultural receiving unit is provided. The assembly may include a covering body configured to, in a first position, extend over an opening of the agricultural receiving unit to prevent access to the opening. The assembly may also include an actuation assembly configured to move the covering body from the first position to a second position. In the second position, the covering body is configured to permit access to the opening of the agricultural receiving unit.

In accordance with embodiments herein, a method of reducing contaminants from entering an agricultural receiving unit may be provided. The method may include placing a covering body in a sealing position over an opening of the agricultural receiving unit to prevent contaminants from entering the opening. The method may also include automatically moving the covering body from the sealing position to a loading position where the covering body permits access to the opening for grain to enter the agricultural receiving unit.

In accordance with embodiments herein, an assembly for receiving grain within an agricultural receiving unit may be provided. The assembly may include a blocking wall that extends about a perimeter of the agricultural receiving unit. The assembly may also include an actuation assembly operably coupled to the blocking wall. The actuation assembly may be configured to move the blocking wall from a first position wherein the blocking wall does not direct grain into the opening of the agricultural receiving unit to a second position where the blocking wall directs grain into the opening of the agricultural receiving unit.

In accordance with embodiments herein, an assembly for covering an agricultural receiving unit may be provided. The assembly may include a covering body configured to, in a sealing position, extend over the opening of the agricultural receiving unit to prevent access to the agricultural receiving unit. The assembly may also include an actuation assembly configured to move the covering body from the sealing position to a loading position. In addition, the assembly may also include a blocking wall that extends about a perimeter of the agricultural receiving unit when the covering body is in the loading position to direct grain into the opening of the agricultural receiving unit.

DETAILED DESCRIPTION

Figure 1:
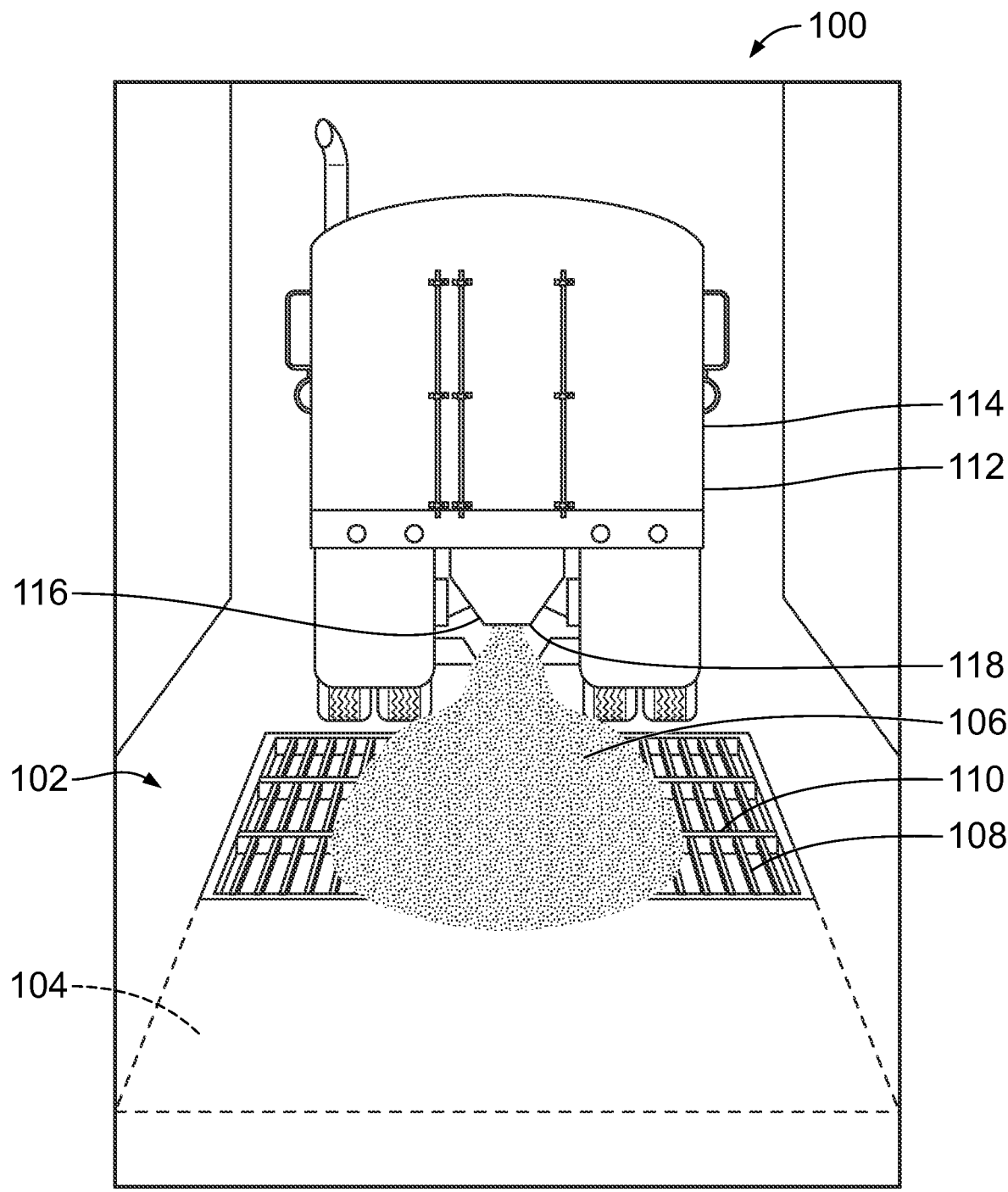
FIG. 1 illustrates a back perspective view of a system for permitting the unloading of agricultural products, in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Presented are assemblies and methods related to the unloading of agricultural products from a vehicle or other transportation devices. The agricultural product may be grain, beans, seeds, or the like. The assembly includes a covering body that is moved by an actuation assembly to extend over the agricultural receiving unit to prevent access to the opening. During loading, the actuation assembly moves the covering body from the opening to permit access to the agricultural receiving unit.

FIG. 1 illustrates a back perspective view of a system 100 that may include an assembly for permitting the unloading of agricultural products into an agricultural receiving unit 102. In one example, the agricultural product is grain. In another example the agricultural product may be beans, seeds, corn kernels, nuts, fertilizer, etc. The agricultural receiving unit is placed below a surface 104 and is of size and shape to receive the agricultural product 106. In particular, the agricultural receiving unit is placed at least partially underground so that storage may take place without taking up space above the ground. In addition, by placing the agricultural receiving unit 102 below the ground, the agricultural product 106 is protected and insulated from weather, contaminants, etc. The agricultural receiving unit 102 includes an opening 108 at the surface 104 to receive the agricultural product 106. The opening 108 is of size and shape to receive the agricultural product. In one embodiment, a grate 110 may be placed over the opening 108 and flush with the top of the surface 104 to allow individuals, vehicles, animals, or the like to be able to walk on the grate 110 without falling into the opening. In one example the grate is removable to permit access to the opening 108. With this said, the grate has plural slots or openings to allow the passage of the agricultural product through the grate 110, and consequently through the opening 108 into the agricultural receiving unit 102.

A vehicle 112 may be provided that includes a compartment 114 for storing an agricultural product 106. The vehicle 112 may be a truck, combine, tractor, attached storage container attached to another vehicle such as a truck, or the like. The compartment 114 may include an opening 116 for dispensing the agricultural product 106. In one embodiment, a chute 118 may be provided at the opening 116 for directing the agricultural product 106 toward the opening 108 of the agricultural receiving unit 102. In this manner, the agricultural product 106 is transferred from the vehicle 112 and into the agricultural receiving unit 102.

Figure 2:
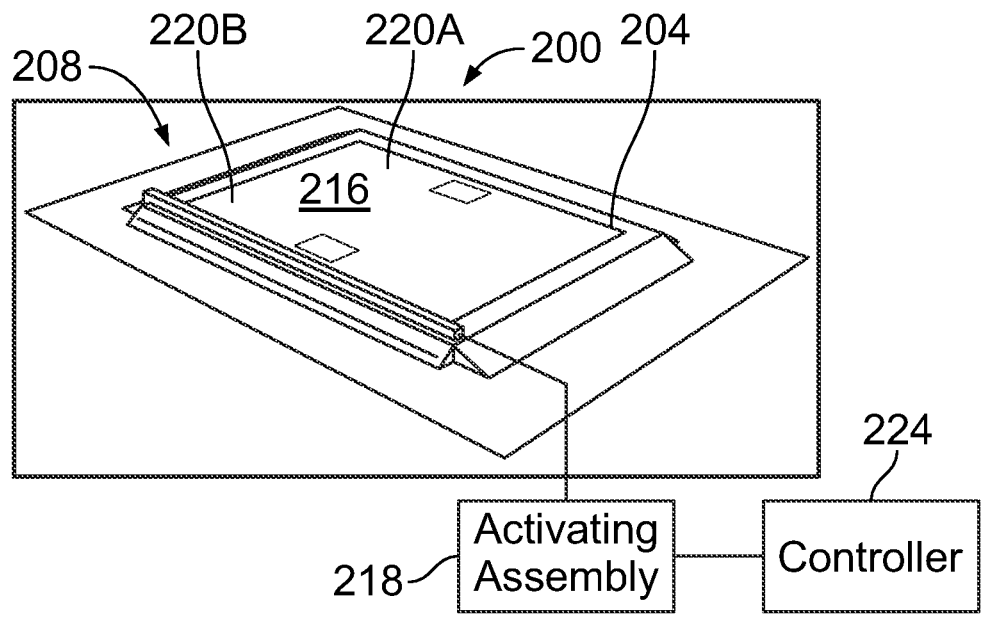
FIG. 2 illustrates a side perspective view of an assembly for permitting the unloading of agricultural products, in accordance with embodiments herein.
Figure 3:
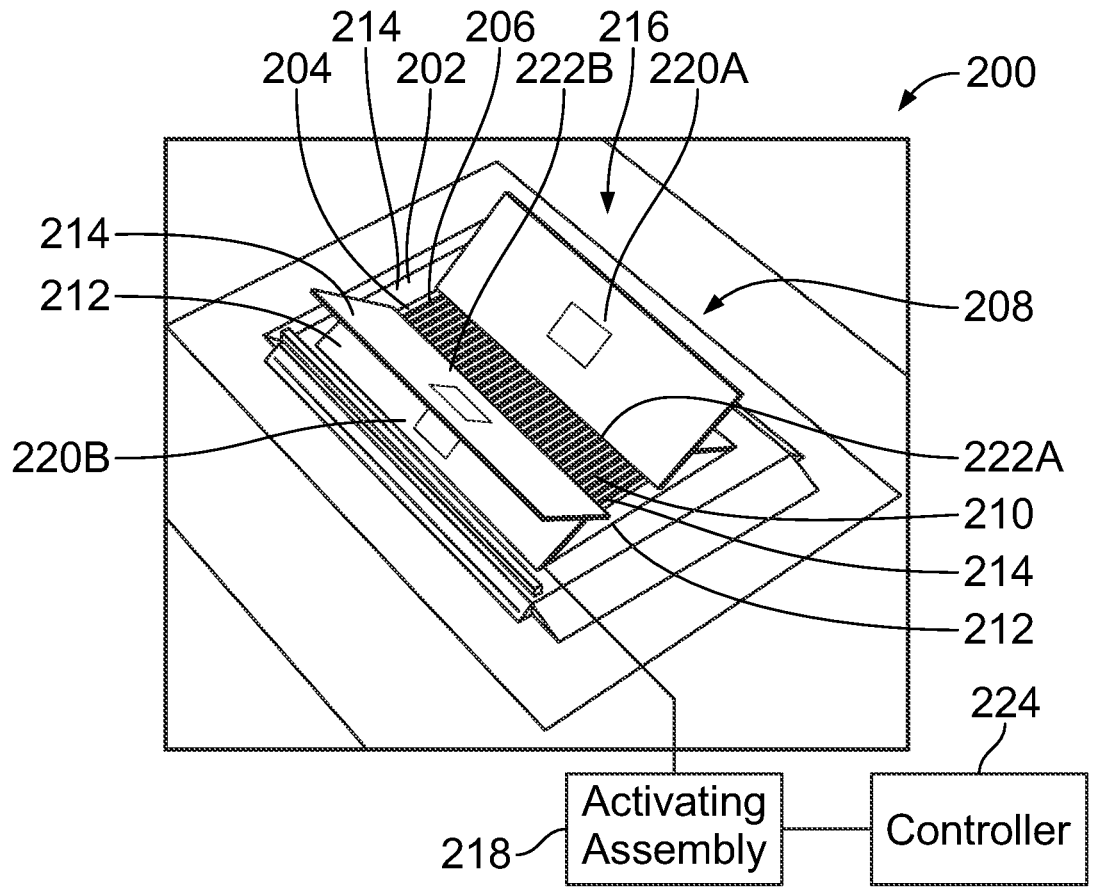
FIG. 3 illustrates a side perspective view of an assembly for permitting the unloading of agricultural products.
Figure 4:
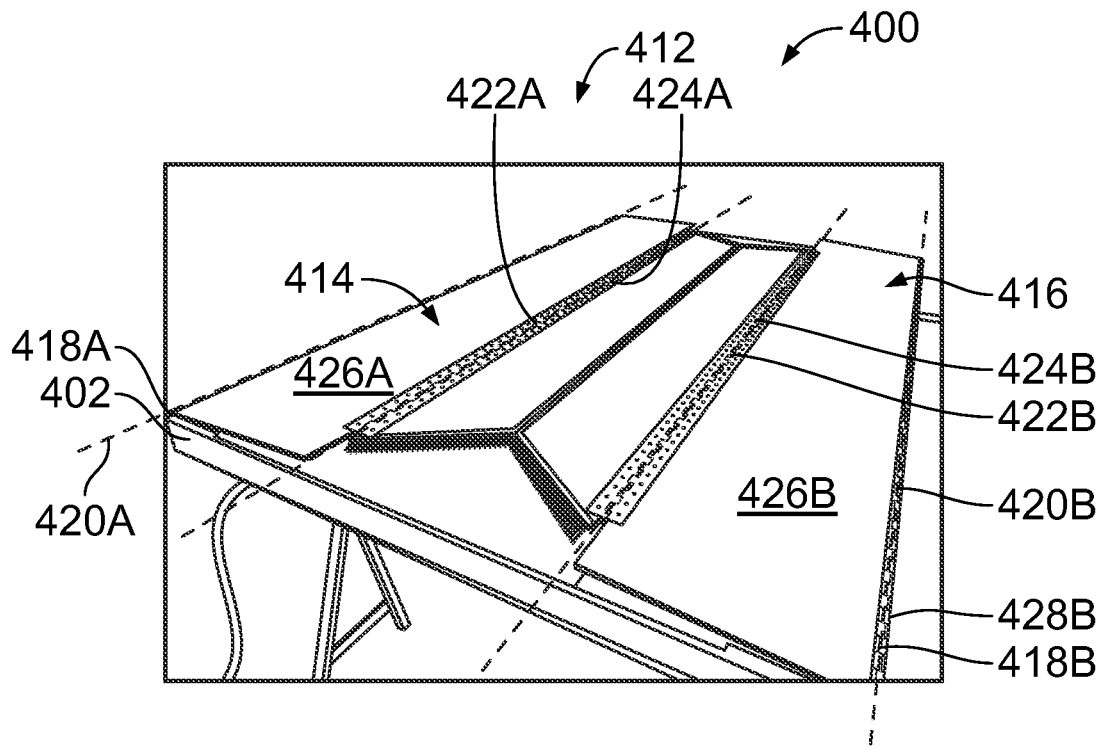
FIG. 4 illustrates a side perspective view of an assembly for permitting the unloading of agricultural products.
Figure 5:
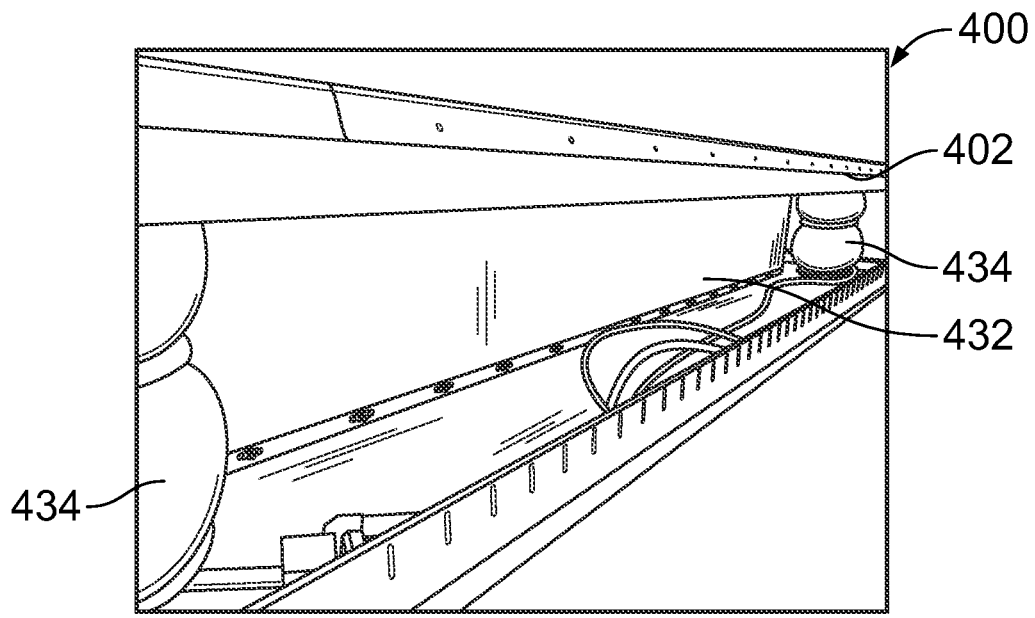
FIG. 5 illustrates a side perspective view of an assembly for permitting the unloading of agricultural products.
Figure 6:
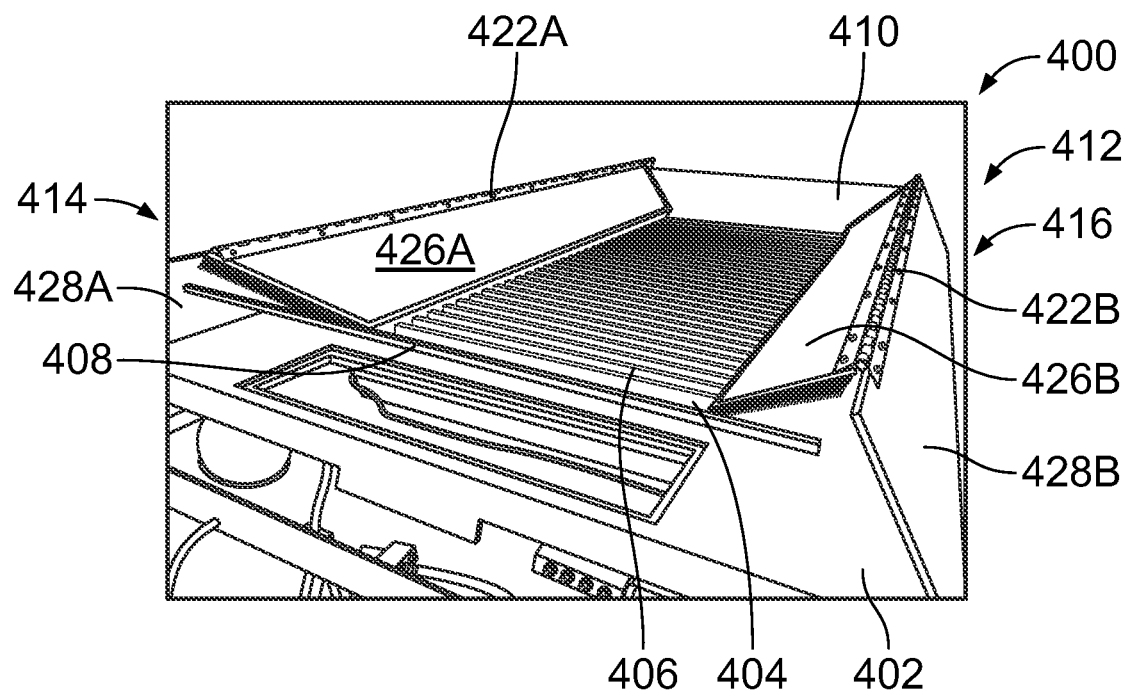
FIG. 6 illustrates a side perspective view of an assembly for permitting the unloading of agricultural products.
Figure 7:
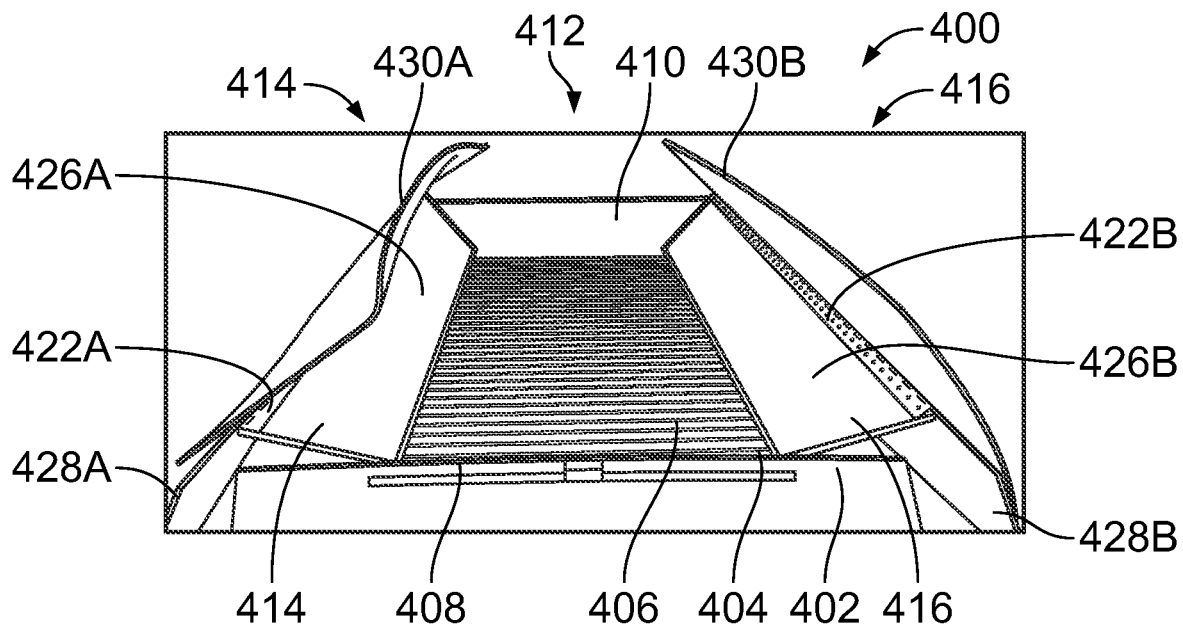
FIG. 7 illustrates a side perspective view of an assembly for permitting the unloading of agricultural products.

FIGS. 2 and 3 illustrate an assembly 200 for permitting the unloading of agricultural products. In one example, the assembly 200 is used in association with the system 100 of FIG. 1. The blocking wall 202 extends at least partially around a perimeter 204 of an opening 206 of an agricultural receiving unit 208. In one example, the opening 206 is covered by a grate 210. The blocking wall 202 can be square, rectangular, circular, have an open side, have two or more spaced pieces, or the like. The blocking wall extends upwardly to form a barrier, or to block agricultural products being disposed through the opening from spilling outside the perimeter 204 of the opening 206. In particular, when the flow of agricultural product from the vehicle exceeds the flow of the agricultural product through the grate 210, the agricultural product begins piling on top of itself to form a mound. That mound continues to increase in diameter size until extending past the perimeter of the opening 206 resulting in agricultural product not flowing into the opening 206. Thus, either such yield is lost, or alternatively pushed into the opening 206 by a shoe, broom, hand, or other unsanitary method. By having the blocking wall 202, the agricultural product engages the blocking wall 202, keeping the agricultural product from moving outward past the opening 206. This allows the agricultural product to eventually go through the opening 206 as the agricultural product continues flowing through the grate 210.

The blocking wall 202 when not in operation may lay flat against the grate, allowing an outside surface 212 to be stepped on while an interior surface 214 faces downward and is protected from contaminants. Alternatively, at least a portion of the blocking wall is secured to the floor to permanently secure the blocking wall to the ground. In one embodiment, one section of the blocking wall is movable to allow access to the opening 206 to a vehicle. In yet another example, the blocking wall 202 is embedded in the ground, and moves from a first position below the ground when not in use to a second position above the ground when in use. In an alternative embodiment, the blocking wall 202 is removably placed around the perimeter 204 of the opening 206 only during an unloading process and is removed and stored otherwise. In this manner, the blocking wall 202 may be removed and cleaned from time to time. In other embodiments, the blocking wall 202 presents a combination of the other embodiments described herein.

The assembly 200 also includes a covering body 216 that is coupled to an actuation assembly 218. In one example, the actuation assembly and covering assembly are a single unit of one piece construction. To this end, in one example, the actuation assembly 218 may be single unit. The actuation assembly 218 moves the covering body 216 from a first position (FIG. 2), or sealing position, where the covering body 216 covers the opening 206 to a second position (FIG. 3), or loading position, where the covering body 216 is retracted and does not cover the opening 206. When the covering body 216 is in the first position, contaminants from the environment are prevented from flowing through the opening 206, contaminating the agricultural products.

In one example, the covering body 216 is flush with a top of the agricultural receiving unit as illustrated in FIG. 2. Alternatively, the covering body 216 may be spaced from the top of the receiving unit, but at least still partially covers the opening to prevent contaminants from entering the opening. The covering body 216 may be of one-piece construction, two-piece construction (as illustrated in FIGS. 2 and 3), multi-piece construction, etc. When the covering body 216 has more than one section, the sections may align, be spaced, overlap, move with respect to one another, move synchronously to one another, move asynchronously to one another, or the like.

In the example embodiment of FIGS. 2 and 3, the covering body 216 includes a first section 220A and a second section 220B that in the first position align with one another to form a full covering body 216. In this manner, in the second position, the first section 220A and second section 220B are spaced apart from one another. In one example, each section 220A, 220B forms a portion of the blocking wall when in the second position.

Alternatively, the covering body 216 may be of single one-piece construction. In one such embodiment, the covering body 216 may form a roll such that in the first position the covering body 216 is unrolled over the opening 206, and the covering body 216 is mechanically rotated in a first rotational direction to move the covering body 216 from the first position to the second position. Then to move the covering body 216 from the second position to the first position, the roll is rotated in the opposite rotational direction.

The actuation assembly 218 may be pneumatically powered, electrically powered, hydraulically powered, magnetically powered, electromagnetically powered, mechanically powered, etc. In particular, any actuation assembly 218 may be coupled to the covering body 216 such that through operation, the actuation assembly 218 causes the covering body to move from the first position to the second position. As an example, a pneumatic cylinder may be attached to a section 220A or 220B such that when the cylinder is extended, the section 220A or 220B is in the first position, and when retracted, the section 220A or 220B folds about the hinge element 222A or 222B until the section 220A or 220B is in the second position. Similarly, a cam element, solenoid, or the like may be utilized to provide similar functionality. Alternatively, in other embodiments, the covering body does not utilize a hinge, and different actuating assemblies 218 may be utilized to move the covering body 216 from the first position to the second position accordingly.

The actuation assembly 218 may be operably coupled to a controller 224 that is configured to provide command signals to automatically actuate the actuation assembly 218 to move the covering body 216 from the first position to a second position. The controller 224 may include input devices such as push buttons, remote controls, or the like such that an individual may operate the actuation assembly 218 to move the covering body 216 from the first position to the second position. Alternatively, the controller 224 may be coupled to a sensor that monitors for the presence of a vehicle that may unload the agricultural product. In one example, the sensor may be a motion sensor the detects the motion of a vehicle backing into position. In another example, the sensor may be a pressure sensor that detects the weight of a vehicle adjacent the opening 206. In other examples, the sensor may detect signals to provide information that may be utilized in determining actuation of a vehicle. For example, the sensor may detect the opening or closing of a vehicle door while also receiving inputs related to a schedule of a time when agricultural products are to be unloaded. Based on the opening or closing of the vehicle door and timing, a determination may be made that grain unloading is to occur, causing automatic actuation of the actuation assembly. Meanwhile, if the door opens, but a scheduled time is not provided, the controller determines not to actuate the assembly. Such determinations may be made from an algorithm, mathematical function, mathematical model, lookup table, decision tree, artificial intelligence, or the like. In each instance, the sensor may be utilized to make determinations for when to operate the actuation assembly. In this manner, the opening is only exposed to potential contaminants during the unloading process. Once complete, the covering body 216 covers the opening, preventing contaminants from reaching the agricultural products.

FIGS. 4-7 illustrate an alternative embodiment of an assembly 400. In this example embodiment, the assembly includes a housing 402 with a central opening 404 that includes or can receive a grate 406. The housing 402 may also include a first blocking wall 408 and a second blocking wall 410 extending from opposite sides of the grate 406. In the illustrated example, each blocking wall 408, 410 is angled such that when agricultural product hits a blocking wall 408, 410, the agricultural product is conveyed via gravity toward the opening 404.

The housing also includes a covering body 412 that in a first position, or sealing position, covers the grate 406, and in the second position, or loading position is moved away from the grate to allow access to the opening 404. The covering body 412 in this embodiment includes a first section 414, and second section 416, that similar to the embodiment of FIGS. 2-3, align with one another to cover the grate 406 in the first position. Each section includes a first hinge element 418A, 418B that may be an end hinge element with a first pivot axis 420A, 420B, and a second hinge element 422A, 422B that may be a central hinge element with a second pivot axis 424A, 424B. Each second hinge element 422A, 422B divides the first section 414 and second section 416 into a first portion 426A, 426B and second portion 428A, 428B respectfully. In this manner, the first portion 426A, 426B of each section 414, 416 can rotated or move about the first hinge element 418A, 418B and second hinge element 422A, 422B, while the second portion 428A, 428B can rotate or move about the second hinge element 422A, 422B.

Optionally, a brush member 430A, 430B may be secured to the first section 414, and/or second section 416. Each brush member 430A, 430B functions to cover the surface of the second portion 428A, 428B of each section 414, 416 and while moving from the sealed position to the loading position engages and removes dirt, debris, etc. from the first portion 426A, 426B of the first section 414 and second section 416. In this manner, such dirt and debris does not fall into the grate upon the opening of the covering body during a later use, improving sanitation.

Disposed below and spaced from the covering body 412 is a support structure 432 that is movably coupled to the covering body 412. In particular plural actuating members 434 of an actuation assembly, that in one example are each airbags, may be placed at spaced iterations between the covering body 412 and support structure 432 such that when each actuating member 434 moves from a first position (compressed) to a second position (inflated), the covering body 412 uncovers the grate 406. In particular, in this embodiment, each actuating member 434 engages an outside section of the first portion 426A, 426B of each section 414, 416. This results in each first portion 426A, 426B rotating about each first hinge element 418A, 418B, and second hinge element 422A, 422B. This results in the first portion 426A, 426B pulling the second portion 428A, 428B to the side to uncover the grate 406. In particular, the second portion 428A, 428B begins pivoting about the second hinge element 422A, 422B resulting in the sliding motion, and eventually lifting away from the grate in the second position. In the second position, each second portion 428A, 428B is angled and functions as a blocking wall along with first blocking wall 408 and second blocking wall 410. Thus, in this embodiment, the blocking wall includes sections that part of the covering body 412, along with sections that are not part of the covering body 412.

Figure 8:
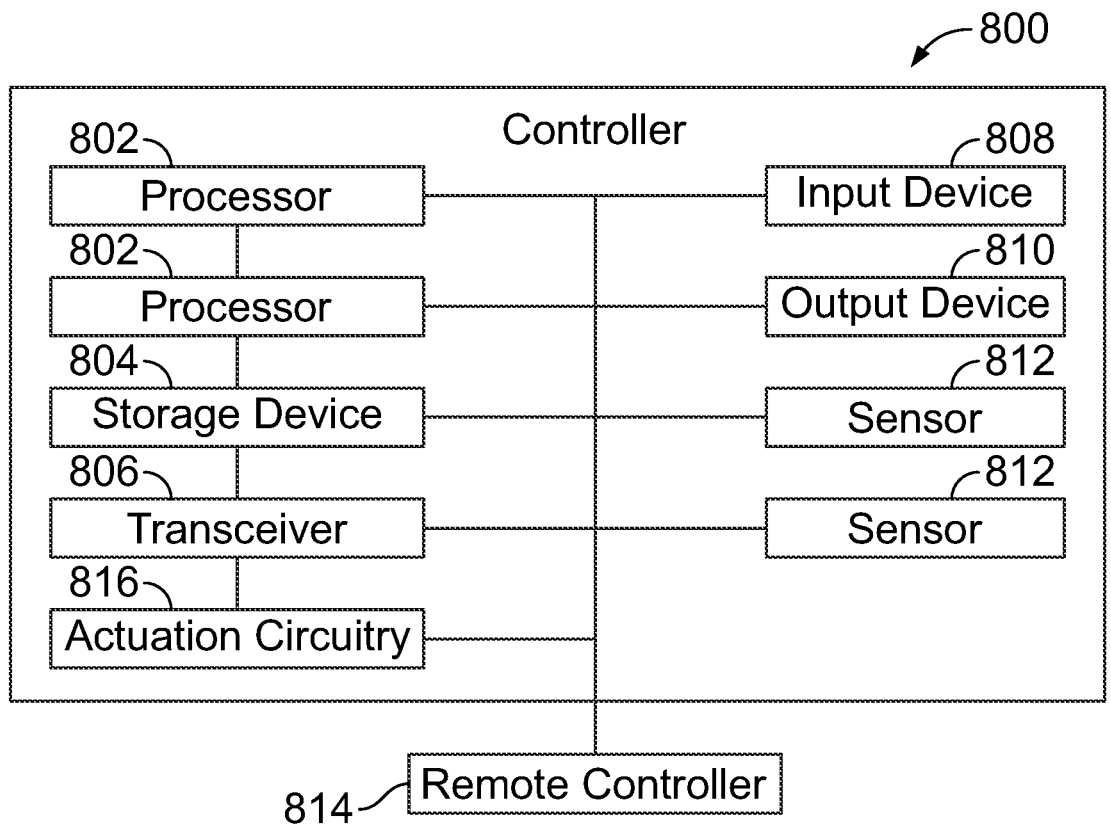
FIG. 8 illustrates a control system for a system for permitting the unloading of agricultural products, in accordance with embodiments herein.

FIG. 8 illustrates a controller 800 that may be utilized in association with an assembly for permitting the unloading of agricultural products. In one example, the controller 800 of FIG. 8 is the controller 224 of FIGS. 2 and 3, or a controller that actuates the actuating members 434 of FIGS. 4-7. The controller 800 may include one or more processors 802, a storage device 804 such as a memory, and a transceiver 806. The transceiver 806 may be separate receiver and transmitter, or a combined receiver and transmitter. The controller 800 may also include one or more input devices 808 and output devices 810. The input device 808 may be a touch screen, keyboard, push button, mouse, or the like. The output device 810 may be a touch screen, speaker, or the like. In one example a touch screen functions as both an input device 808 and output device 810.

The controller 800 may also include one or more sensors 812. The one or more sensors 812 may include motion sensors, pressure sensors, remote sensors, sensors described in relations to the assembly of FIGS. 2 and 3, etc. The sensor 812 detects signals that may be utilized by the one or more processors 802 to determine that a vehicle is in place for the unloading of an agricultural product. The sensor 812 may communicate with a communication device associated with a vehicle unloading the agricultural product, remote device, etc. to provide information for the one or more processors 802. The one or more processors 802 may also utilize information stored in the storage device 804, computer programs or applications, or the like to make determinations regarding the presence of a vehicle for unloading the agricultural product. In one example, the controller 800 may be communicatively coupled to a remote controller 814 that may be used by an operator to operate an actuation assembly. Specifically, using the remote controller 814, an input such as a push button, voice activation, etc. may be utilized to actuate the actuation assembly.

The controller 800 may also include actuation circuitry 816. The actuation circuitry 816 functions to actuate an actuation assembly. In particular, the one or more processors 802 may receive information, data, signals, etc. from one or more sensors to make determinations regarding whether to actuate the actuation assembly. Similarly, information within the storage device may also be utilized. Alternatively, a combination of information, data, signals, etc. from the one or more sensors 812 and storage device 804 are utilized to make such determinations. Once a determination is made, the actuation circuitry 816 causes actuation of the actuation assembly. In another example, a push button, manual input, or the like results in the actuation circuitry 816 causing actuation of the actuation assembly.

Figure 9:
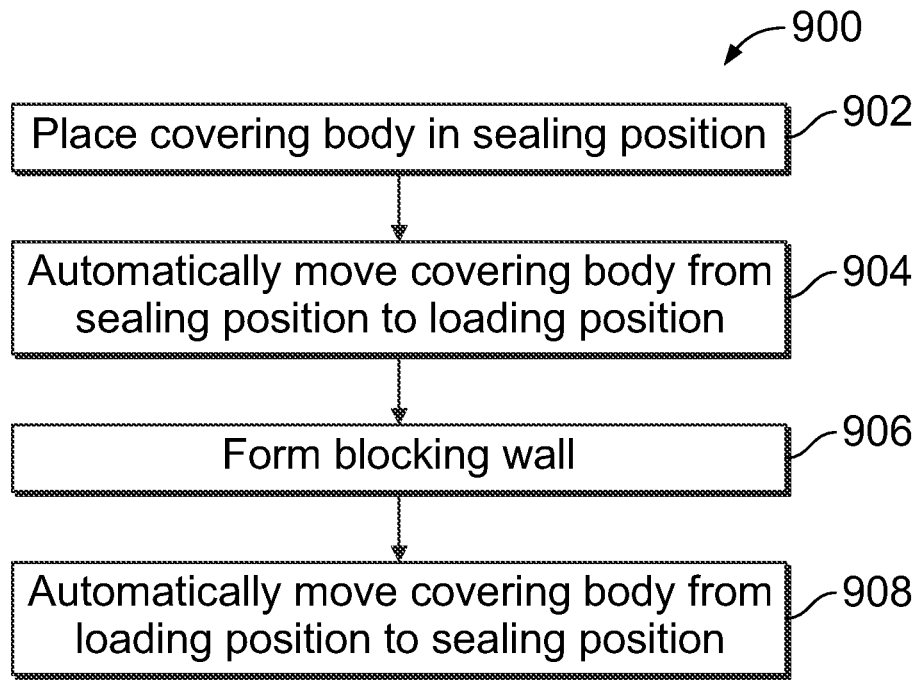
FIG. 9 illustrates a block diagram of a method of reducing contaminants from entering an agricultural receiving unit, in accordance with embodiments herein.
Figure 10:
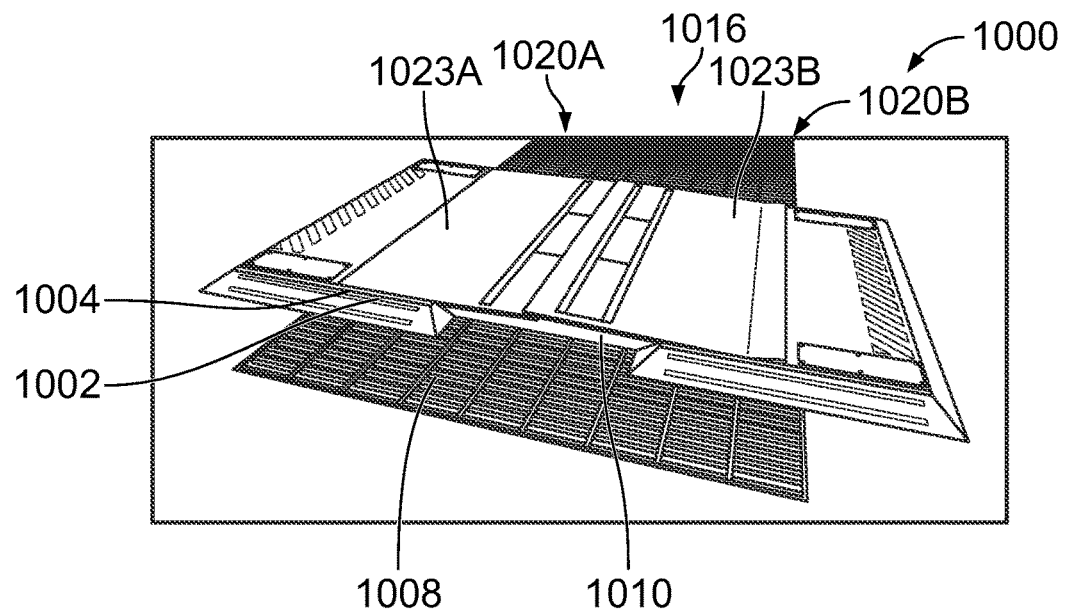
FIG. 10 illustrates a side perspective view of an assembly for permitting the unloading of agricultural products.

FIG. 9 illustrates a schematic block process diagram of a method 900 of reducing contaminants from entering an agricultural receiving unit. In one example, the agricultural receiving unit is the agricultural receiving unit of any of FIGS. 1-7.

At 902, a covering body is placed in a sealing position over an opening of an agricultural receiving unit to prevent contaminants from entering the opening. In the sealing position, at least a portion of an opening of the agricultural receiving unit that receives an agricultural product is blocked, over the top of, covered, etc. to prevent contaminants such as direct, moisture, dust, snow, mud, insects, etc. from entering the agricultural receiving unit.

At 904, the covering body is moved from the sealing position to a loading position where the covering body permits access to the opening for agricultural product to enter the agricultural receiving unit. In one embodiment the covering body is automatically moved by a control system, while in other embodiments, the covering body is manually moved. In one example, the agricultural product is grain. In another example the agricultural product may be beans, seeds, corn kernels, nuts, fertilizer, etc. The covering body may move from the sealing position to a loading position by slidably moving a first section of the covering body away from a second section of the covering body. In another example, the moving of the covering body from the sealing position to the loading position includes pneumatically moving the covering body. Alternatively, the movement occurs by mechanically moving the covering body from the sealing position to the loading position, electrically moving the covering body from the sealing position to the loading position, or the like.

In one example, the covering body is automatically moved form the sealing position to the loading position in response to receiving a command signal at an actuation assembly. Such a command signal may be manually input at an interface of a controller, at the actuation assembly, at a remote device, at a remote control, etc. In another example, the actuation assembly includes a controller that communicates with a sensor. Based on a determination made from a signal generated by the sensor, the covering body is automatically moved via actuation circuitry. The sensor may be a motion sensor, pressure sensor, door sensor, or the like. In another example, a vehicle controller may communicate with a controller of the actuation assembly to cause the covering body to be automatically moved from the sealing position to the loading position. In this manner, the movement may be caused automatically by detecting, with a sensor, movement of a vehicle, and communicating a command signal to an actuation assembly to move the covering body.

At 906, a blocking wall is formed about at least a portion of a perimeter of the opening of the agricultural receiving unit to prevent spilling of the agricultural product past the opening of the agricultural receiving unit. In one example, the blocking wall may be a separate body from the covering body. In an alternative embodiment, the blocking wall may be at least partially formed from the covering body. Specifically, as the covering body moves from the sealing position to the loading position, the covering body has a first section that folds upon itself and a second section that also folds upon itself that can form a portion of the blocking wall.

At 908, the covering body is automatically moved from the loading position to the sealing position after unloading of grain into the agricultural receiving unit. Again, a controller of the actuation assembly may receive a signal resulting in the actuation. The signal may be received from a manual input at the controller interface, a remote control, remote device, a vehicle controller in communication with the actuation assembly controller, or the like. In other examples, the signal may be received from one or more sensors. The sensors may be motion sensors, pressure sensors, door sensors, etc. In one embodiment, a motion sensor is provided at the opening of the agricultural receiving unit to detect when no more agricultural product is flowing through the opening. In one example, the controller includes a timer such that when no flow through the opening is detected for a determined time, such as thirty seconds, the controller automatically moves the covering body from the loading position to the sealing position. In this manner, a worker does not need to remember to cover the opening, as such closing may occur without human interaction.

FIGS. 10-13 illustrate yet another example embodiment of an assembly 1000 for permitting the unloading of agricultural products. In one example, the assembly 1000 is used in association with the system 100 of FIG. 1. The blocking wall 1002 extends at least partially around a perimeter 1004 of an opening 1006 of an agricultural receiving unit 1008. In one example, the opening 1006 is covered by a grate 1010.

The blocking wall 1002 in the embodiment of FIGS. 10-13 extends upwardly around the opening 1006 to form a barrier, or to block agricultural products being disposed through the opening from spilling outside the perimeter 1004 of the opening 1006. In particular, the blocking wall 1002 has an increased height around the opening and may vary in height accordingly. By having the blocking wall 1002, the agricultural product engages the blocking wall 1002, keeping the agricultural product from moving outward past the opening 1006. This allows the agricultural product to eventually go through the opening 1006 as the agricultural product continues flowing through the grate 1010. In this example embodiment, the blocking wall 1002 forms the perimeter 1004 around the opening 1006 such that the height of the blocking wall 1002 remains static. The blocking wall 1002 in one example extends partially around the perimeter of the opening 1006. Thus, in one example, the blocking wall 1002 may extend along only one side, or even partially around one side of the opening 1006. In another example, the blocking wall 1002 may extend along two separate sides and not couple to one another. Alternatively, the blocking wall 1002 may extend along two sides and couple, engage one another, be side by side to one another, or the like. In yet another example, the blocking wall 1002 may extend along three sides, or along all four sides. The blocking wall 1002 in one example completely surrounds the opening 1006. The blocking wall may be actuated such that not all portions of the blocking wall are provided at the same time. For example, in one embodiment, one portion or side of a blocking wall may be put in place before a vehicle backs into place and a covering body 1016 that forms two sides of the blocking wall are placed in an open, blocking position. The fourth blocking wall portion or side may be put in place after a vehicle is in place for unloading to prevent a chute, or expelling device from hitting the fourth blocking wall portion or side while the vehicle is moving to an unloading position.

The assembly 1000 also includes the covering body 1016 that is coupled to an actuation assembly 1018. The actuation assembly 1018 moves the covering body 1016 from a first position (FIGS. 10, 12), or sealing position, where the covering body 1016 covers the opening 1006 to a second position (FIG. 11, 13), or loading position, where the covering body 1016 is retracted and does not cover the opening 1006. When the covering body 1016 is in the first position, contaminants from the environment are prevented from flowing through the opening 1006, contaminating the agricultural products. When the covering body 1016 is in the second position, the covering body may function as a component of the blocking wall 1002 to prevent overflowing agricultural product from spilling outside of the opening 1006.

Figure 11:
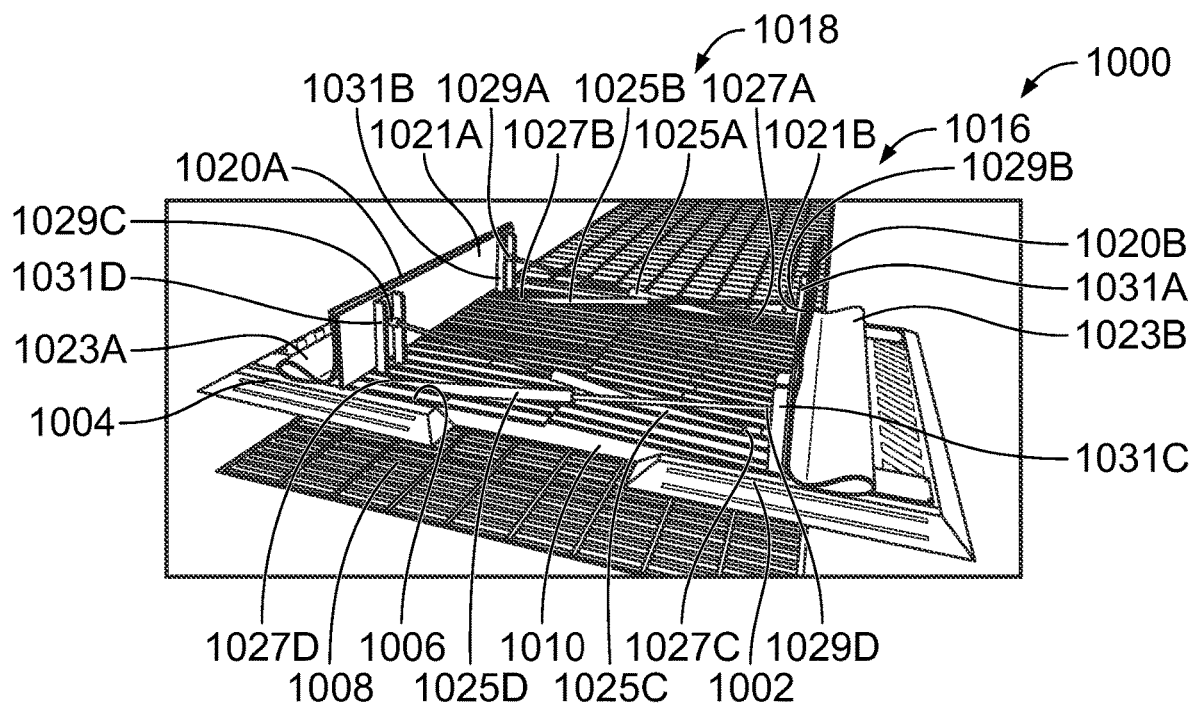
FIG. 11 illustrates a side perspective view of an assembly for permitting the unloading of agricultural products.
Figure 12:
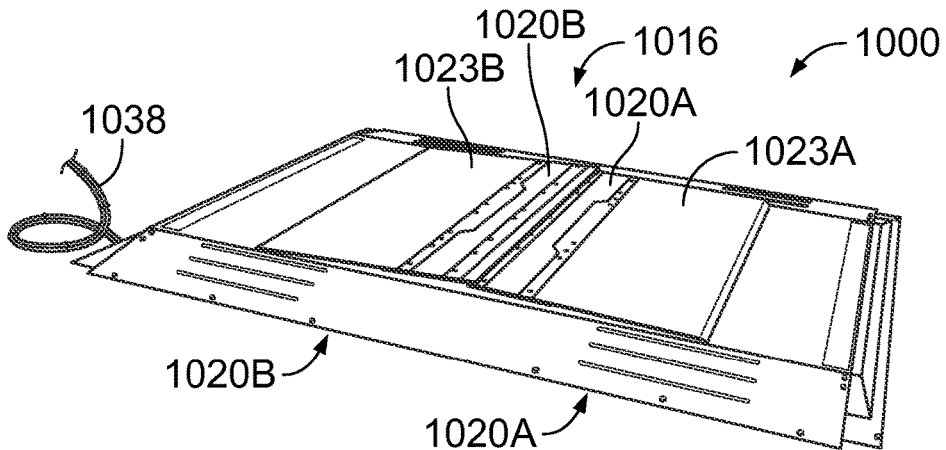
FIG. 12 illustrates a side perspective view of an assembly for permitting the unloading of agricultural products.
Figure 13:
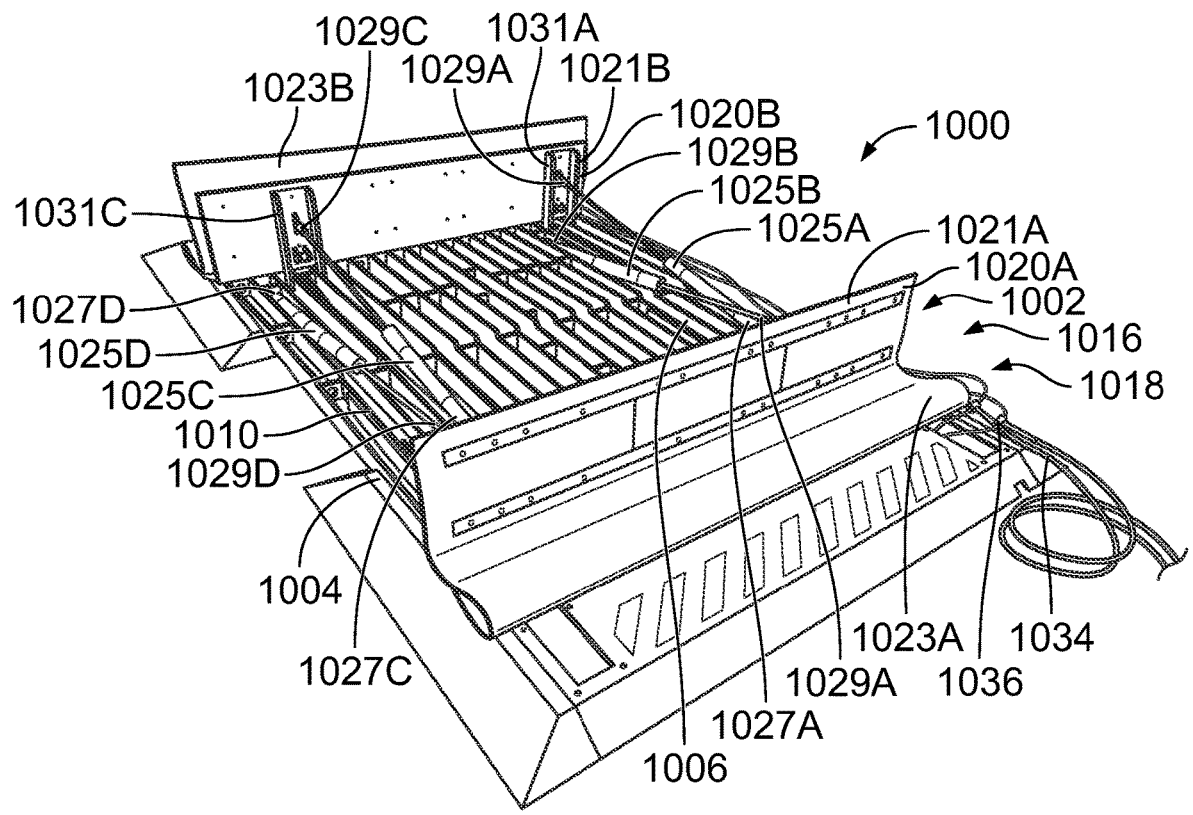
FIG. 13 illustrates a side perspective view of an assembly for permitting the unloading of agricultural products.

In the example embodiment of FIGS. 10-13, the covering body 1016 includes a first section 1020A and a second section 1020B. The first section 1020A includes a first plate 1021A and a first elastic cover 1023A that overlaps the first plate 1021A. In particular, the first elastic cover 1023A may be received by and secured to the first plate 1021A by fasteners, adhesive, or the like. In one example, the first elastic cover 1023A may be formed from a rubber material. The first elastic cover may be pulled taut when the first plate 1021A is in the first position (FIG. 10) to cover the grate 1010, and fold upon itself when in the second position (FIG. 11). Similarly, the second section 1020B can include a second plate 1021B coupled to a second elastic cover 1023B in a similar manner as described in relation to the first section 1020A.

The actuation assembly 1018 of the embodiment of FIGS. 10-13 includes actuators 1025A-D. In one example, the actuators are pneumatic pistons. Each piston is coupled at a first end 1027A-D to the grate 1010 adjacent the plate 1021A or 1021B, and extends to a second end 1029A-D that secures to the opposite plate 1021A or 1021B. While in the example embodiment four separate actuators 1025A-D are illustrated, in other example embodiments, only two actuators, one coupled to each section 1020A and 1020B are provided. In other examples, more than four actuators are utilized. Similarly, while the actuators 1025A-D in this example embodiment are illustrated as secured to the grate 1010, in other example embodiments, the actuators may be secured to a frame of the assembly, a blocking wall of the assembly, or the like. In this example, by being on the underside of each of the first section 1020A and second section 1020B, the first and second sections protect the actuators 1025A-D from dust, debris, weather, etc., reducing wear and tear on the actuators 1025A-D. In this example embodiment, the actuators 1025A-D are each coupled to a bracket 1031A-D for addition support, though such brackets are optional for the coupling.

In one example, the actuation assembly 1018 may include an air-supply tube 1034 that includes an inlet 1036 that may be removably coupled to a pressurized air source 1038. In one example, the pressurized air source 1038 may be a hose that includes pressurized air, such as a pressurized air source 1038 typically utilized to provide air for tires of a bike, vehicle, or the like. Thus a simple pressurized air source may be utilized to provide the pressurized air required for actuating the actuators 1025A-D.

The actuation assembly 1018 may be operably coupled to a controller that is configured to provide command signals to automatically actuate the actuation assembly 1018 to move the covering body 1016 from the first position to a second position. The controller may include input devices such as push buttons, remote controls, or the like such that an individual may operate the actuation assembly 1018 to move the covering body 1016 from the first position to the second position. Alternatively, the controller may be coupled to a sensor that monitors for the presence of a vehicle that may unload the agricultural product.

In one or more embodiments, an assembly for covering an agricultural receiving unit is provided. The assembly may include a covering body configured to, in a first position, extend over an opening of the agricultural receiving unit to prevent access to the opening. The assembly may also include an actuation assembly configured to move the covering body from the first position to a second position. In the second position, the covering body is configured to permit access to the opening of the agricultural receiving unit.

Optionally, the covering body includes a first section and a second section. In the first position the first section aligns and with the second section, and in the second position, the first section is spaced apart from the second section. In one aspect, the covering body may be configured to at least partially extend around the perimeter of the agricultural receiving unit, and in the second position, to prevent grain from spilling past the opening of the agricultural receiving unit. In another aspect, the assembly may also include a blocking wall configured to at least partially extend around the perimeter of the agricultural receiving unit when the covering body is in the second position.

Optionally, the actuation assembly may include a pneumatic actuator coupled to the covering body to move the covering body from the first position to the second position. In another embodiment, the pneumatic actuator is a piston actuator. In one example, the assembly may also include a controller operably coupled to the actuation assembly and configured to provide command signals to automatically actuate the actuation assembly to move the covering body from the first position to a second position. In one aspect, the controller may be coupled to a sensor configured to detect the presence of a vehicle adjacent the agricultural receiving unit.

Optionally, the actuation assembly may include at least one of a mechanical device, or an electrical device. In one aspect, the covering body may be flush with a top of the agricultural receiving unit in the first position.

In one or more embodiments, a method of reducing contaminants from entering an agricultural receiving unit may be provided. The method may include placing a covering body in a sealing position over an opening of the agricultural receiving unit to prevent contaminants from entering the opening. The method may also include automatically moving the covering body from the sealing position to a loading position where the covering body permits access to the opening for grain to enter the agricultural receiving unit.

Optionally, the method may also include automatically moving the covering body from the loading position to the sealing position after unloading of grain into the agricultural receiving unit. In one aspect, automatically moving the covering body from the sealing position to the loading position comprises slidably moving a first section of the covering body away from a second section of the covering body. In another aspect, in the second position, the first section forms a first V-shape about a first hinge element, and wherein the second section forms a second V-shape about a second hinge element. In one example, automatically moving the covering body from the sealing position to the loading position may include pneumatically moving the covering body. In another example, automatically moving the covering body from the sealing position to the loading position comprises actuating at least one pneumatic piston. Alternatively, automatically moving the covering body from the sealing position to the loading position may include one of mechanically moving the covering body from the sealing position to the loading position, or electrically moving the covering body from the sealing position to the loading position.

Optionally, the method may also include forming a blocking wall with the covering body about at least a portion of a perimeter of the agricultural receiving unit to prevent spilling of grain past the blocking wall. Alternatively, the method may also include forming a blocking wall about at least a portion of a perimeter of the agricultural receiving unit as the covering unit moves from the first position to the second position. In one aspect, the method may also include receiving a command signal at an actuation assembly, and moving the covering body from the first position to the second position in response to receiving the command signal. In another example, the method may also include detecting, with a sensor, movement of a vehicle, and communicating a command signal to an actuation assembly to move the covering body from the first position to the second position in response to detecting the movement of the vehicle.

In one or more embodiments, an assembly for receiving grain within an agricultural receiving unit may be provided. The assembly may include a blocking wall that extends about a perimeter of the agricultural receiving unit. The assembly may also include an actuation assembly operably coupled to the blocking wall. The actuation assembly may be configured to move the blocking wall from a first position wherein the blocking wall does not direct grain into the opening of the agricultural receiving unit to a second position where the blocking wall directs grain into the opening of the agricultural receiving unit.

Optionally, the actuation assembly may include at least one of a pneumatic actuator, a mechanical actuator, or an electrical actuator. In one aspect, the actuation assembly may be coupled to a covering body that seals the opening of the agricultural receiving unit when the blocking wall is in the first position. In another aspect, the actuation assembly may be configured to move the covering body as the actuation assembly moves the blocking wall from the first position to the second position. In another embodiment, the blocking wall may be transverse to a top surface of the agricultural receiving unit in the second position.

In one or more embodiments, an assembly for covering an agricultural receiving unit may be provided. The assembly may include a covering body configured to, in a sealing position, extend over the opening of the agricultural receiving unit to prevent access to the agricultural receiving unit. The assembly may also include an actuation assembly configured to move the covering body from the sealing position to a loading position. In addition, the assembly may also include a blocking wall that extends about a perimeter of the agricultural receiving unit when the covering body is in the loading position to direct grain into the opening of the agricultural receiving unit.

Optionally, the blocking wall may be at least partially formed from the covering body. In one aspect, the blocking wall may be separate from the covering body.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An assembly for covering an agricultural receiving unit comprising:
    a covering body configured to, in a first position, extend over an opening of the agricultural receiving unit to prevent access to the opening;
    an actuation assembly configured to move the covering body from the first position to a second position;
    wherein in the second position, the covering body is configured to permit access to the opening of the agricultural receiving unit; and
    a blocking wall at the opening and at least partially extending perpendicular to the covering body around a perimeter of the opening and configured to prevent spilling of an agricultural product past the opening of the agricultural receiving unit;
    wherein the blocking wall includes a first blocking wall and a second blocking wall, wherein the first blocking and the second blocking wall are each angled at an angle that is not ninety degrees to convey the agricultural product toward the opening.

2. The assembly of claim 1, wherein the actuation assembly is coupled to the covering body.

3. The assembly of claim 1, wherein the covering body comprises a first section and a second section;
    wherein in the first position the first section aligns and with the second section, and
    wherein in the second position, the first section is spaced apart from the second section.

4. The assembly of claim 1, wherein the covering body is configured to at least partially extend around the perimeter of the agricultural receiving unit, in the second position, to prevent grain from spilling past the opening of the agricultural receiving unit.

5. The assembly of claim 1, further comprising:
    a controller operably coupled to the actuation assembly and configured to provide command signals to automatically actuate the actuation assembly to move the covering body from the first position to a second position; and
    a sensor coupled and in communication with the controller and configured to detect the presence of a vehicle adjacent the agricultural receiving unit.

6. The assembly of claim 1, wherein the actuation assembly includes at least one of a pneumatic actuator, a hydraulic actuator, a mechanical actuator, or an electrical actuator.

7. A method of reducing contaminants from entering an agricultural receiving unit comprising:
    placing a covering body having an elastic cover in a sealing position over an opening of the agricultural receiving unit to prevent contaminants from entering the opening; and
    automatically moving the covering body from the sealing position to a loading position where the covering body permits access to the opening for an agricultural product to enter the agricultural receiving unit; and
    folding the elastic cover upon itself in response to an actuating member moving a plate secured to the elastic cover from the sealing position to the loading position;
    wherein the elastic cover extends over and completely covers the moving plate to prevent the contaminants from entering the opening in the sealing position.

8. The method of claim 7, further comprising: automatically moving the covering body from the loading position to the sealing position after unloading of the agricultural product into the agricultural receiving unit.

9. The method of claim 7, wherein automatically moving the covering body from the sealing position to the loading position comprises slidably moving a first section of the covering body away from a second section of the covering body.

10. The method of claim 9, wherein the first section includes a first portion having a first hinge element at a first end, and a second hinge element at a second end, the second hinge element coupled to a second portion of the first section; and wherein the first section pivots about the first hinge element and about the second hinge element.

11. The method of claim 7, wherein automatically moving the covering body from the sealing position to the loading position comprises actuating at least one pneumatic piston.

12. The method of claim 7, wherein automatically moving the covering body from the sealing position to the loading position comprises one of pneumatically moving the covering body from the sealing position to the loading position, mechanically moving the covering body from the sealing position to the loading position, hydraulically moving the covering body from the sealing position to the loading position, or electrically moving the covering body from the sealing position to the loading position.

13. The method of claim 7, further comprising forming a blocking wall about at least a portion of a perimeter of the agricultural receiving unit and configured to prevent spilling of an agricultural product past the opening of the agricultural receiving unit.

14. The method of claim 7, wherein the agricultural product is at least one of beans, seeds, corn kernels, nuts or fertilizer.

15. An assembly for receiving an agricultural product within an agricultural receiving unit comprising:
- a covering body comprising:
    - a first plate configured to, in a sealing position, extend over an opening of the agricultural receiving unit to prevent access to the agricultural receiving unit; and
    - a second plate configured to, in a sealing position, extend over the opening of the agricultural receiving unit to prevent access to the agricultural receiving unit;
- an actuation assembly comprising:
    - a first actuating member engaging the first plate and configured to move vertically to move the first plate from the sealing position of the first plate to a loading position of the first plate; and
    - a second actuating member configured to move vertically to move the second plate from the sealing position of the second plate to a loading position of the second plate;
- wherein the covering body further comprises a first elastic cover secured to the first plate and configured to extend completely over the first plate and the opening when the first plate is in the sealing position and fold upon itself in the loading position, and a second elastic cover secured to the second plate and configured to extend completely over the second plate and the opening when the second plate is in the sealing position and fold upon itself in the loading position.

16. The assembly of claim 15, further comprising a grate within the opening and secured to the covering body.

17. The assembly of claim 15, further comprising:
- a controller operably coupled to the actuation assembly and configured to provide command signals to automatically actuate a first pneumatic piston to move the first plate from the sealing position to the loading position, and automatically actuate a second pneumatic piston to move the second plate from the sealing position to the loading position.

18. The assembly of claim 17, further comprising a sensor coupled and in communication with the controller and configured to detect the presence of a vehicle adjacent the agricultural receiving unit.

* * * * *